United States Patent [19]
Van Der Burgt

[11] Patent Number: 5,490,376
[45] Date of Patent: Feb. 13, 1996

[54] GAS TURBINE SYSTEM

[75] Inventor: Maarten J. Van Der Burgt, The Hague, Netherlands

[73] Assignee: Shell Oil Company, Houston, Tex.

[21] Appl. No.: 263,913

[22] Filed: Jun. 22, 1994

[30] Foreign Application Priority Data

Jun. 23, 1993 [EP] European Pat. Off. .............. 93201820

[51] Int. Cl.$^6$ ..................................... F02C 7/04
[52] U.S. Cl. ...................... 60/39.06; 60/39.465
[58] Field of Search .................. 60/39.06, 39.12, 60/39.182, 39.27, 39.405

[56] References Cited

U.S. PATENT DOCUMENTS

| | | | |
|---|---|---|---|
| 3,849,662 | 11/1974 | Blaskowski et al. ................ | 60/39.182 |
| 3,928,961 | 12/1975 | Pffeferle ................................ | 60/39.06 |
| 4,212,160 | 7/1980 | Blaskowski ........................... | 60/39.12 |
| 4,238,923 | 12/1980 | Waryasz ................................ | 60/39.12 |
| 4,288,979 | 9/1981 | Liljedahl et al. ..................... | 60/39.12 |
| 4,677,829 | 7/1987 | Archer et al. ......................... | 60/39.02 |

OTHER PUBLICATIONS

J. G. Meier et al., "Development and Application for Gas Turbines for Medium–BTu Gaseous Fuels", Jour. Engr. For Gas Turbines and Power, Jan. 1986, vol. 108, pp. 182–190.

*Primary Examiner*—Timothy S. Thorpe

[57] ABSTRACT

A method for operating a gas turbine system using low-Btu gaseous fuel is disclosed in which air compressed in a compressor unit to obtain a compressed gas stream and low-Btu gaseous fuel is combusted with the compressed gas stream both supplied to said combustion unit, thereby obtaining hot product gas. The hot product gas supplied thereto is expanded to drive an expansion turbine unit to generate mechanical power.

17 Claims, 1 Drawing Sheet

GAS TURBINE SYSTEM

BACKGROUND OF THE PRESENT INVENTION

The present invention relates to a gas turbine system and to a method for operating such a system.

In particular the present invention concerns a gas turbine system and related method of operating when using low Btu gaseous fuel, in that the system comprises a compressor unit for compressing air to compressed air, a combustion unit for combusting said fuel with the compressed air, both supplied to said combustion unit, thereby obtaining hot product gas, and an expansion turbine unit driven by the hot product gas supplied thereto and generating mechanical power.

Such a method and gas turbine system are well known in the art. For example in the article by J. Javetski, "A special report. The changing world of GAS TURBINES", Power, September 1978, Vol. 122, No. 9, discusses prior art and present developments in this field of application.

As to the case of combustion of low Btu gases and residual fuels additional modifications are discussed. Especially it is proposed to increase combustor diameters and lengths to accommodate with such fuels.

It will be clear that supplying low Btu gases to conventional gas turbine systems will require additional measures. Usually such systems are designed on being driven by combustion products originating from fuels having a high heating value per unit of mass, such as there are for natural gas or kerosine. In this context, fuels for such systems are referred to as high-, medium-, and low-Btu gaseous fuels as can be read in the article by J. G. Meier et al., "Development and Application of Industrial Gas Turbines for Medium-Btu Gaseous Fuels", Journal of Engineering for Gas Turbines and Power, January 1986, Vol. 108, pages 182–190. In particular low Btu-gases are defined as having a low heating value (LHV) when ranging from 3 to 8 $MJ/Nm^3$ (equivalent with 75 to 200 Btu/scf).

Instabilities have to be expected when operating such systems with low-Btu gases as fuel supplied to the combustion unit, for example, because of varying heating values and/or varying mass flow values. Blast furnace gas is used as a low-BTU gas.

In order to remedy the shortcomings of the system addressed above, the Meier article discloses some measures as can be seen in table 7 thereof. Moreover, from this article it can be read that mixing such fuels with air prior to injection is discouraged because of danger of auto-ignition.

From U.S. Pat. No. 4,677,829 it is also known to feed a gas turbine with fuel only consisting of low-Btu gases. In this patent inlet air to the compression unit is heated to increase the temperature of the inlet air, thereby decreasing its density and consequently its mass flow. Thus, although low-Btu gas is employed, a constant power output is obtained.

From the above a plurality of measures in order to operate conventional gas turbine systems, more or less modified, with only low-Btu gaseous fuel are known. However, substantial modifications as to the respective units or substantially increased complexity of the system have appeared to be necessary. Especially as to countries where low-Btu gaseous originating from gasifying biomass is present the above measures will be problematic.

SUMMARY OF THE INVENTION

Thus it is a main object of the present invention to provide a gas turbine system and method for operating with only low-Btu gaseous fuel comprising only minor modifications compared to conventional systems.

It is a further object of the present invention to have such a method and system which can be driven and operated in an economic and reliable way.

Therefore, in accordance with the present invention, the method further comprises supplying low-Btu gaseous fuel to said compressor unit. Preferably said fuel makes up at most 20% (by volume) of the air supplied to the compressor unit.

In another aspect of the present invention, the system further comprises at the compressor inlet an additional inlet for supplying low-Btu gaseous fuel. The additional inlet has an inlet surface area making up at most 20% (by surface) of the compressor inlet surface.

BRIEF DESCRIPTION OF THE DRAWING

The brief description above, as well as further objects, features and advantages of the present invention will be more fully appreciated by reference to the following detailed description of the preferred embodiments which should be read in conjunction with the accompanying drawings in which.

DETAILED DESCRIPTION OF THE PREFERRED EMBODIMENTS

Figure 1:
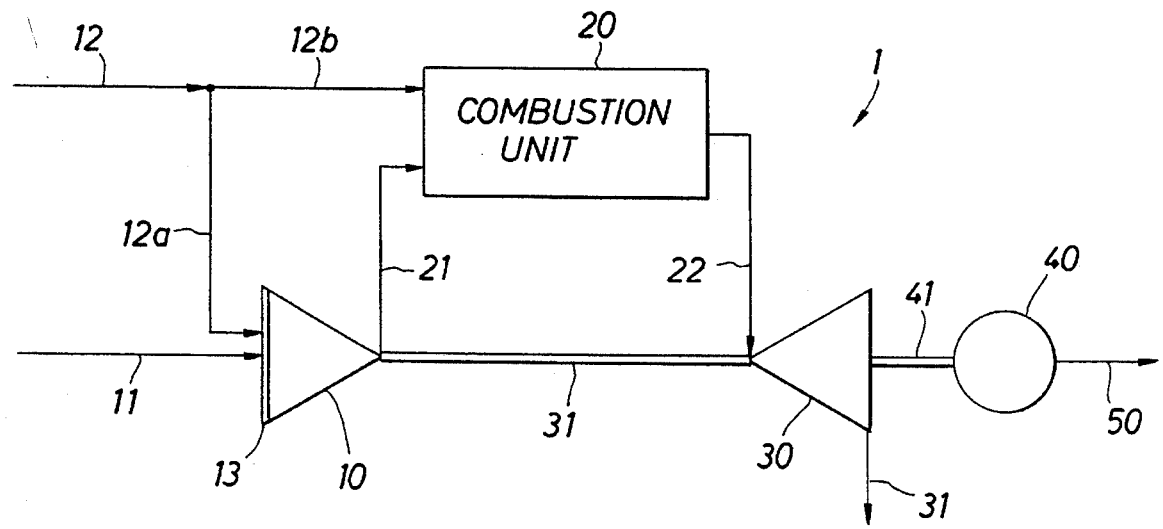
FIG. 1 is a schematic illustration of the gas turbine system of the present invention.

In FIG. 1 a gas turbine system 1 in accordance with the present invention is shown.

To a compressor unit 10 air is supplied via line 11 and a compressor inlet 13 to be compressed to compressed air to be guided further to a combustion unit 20. Low-Btu gaseous fuel is supplied to the combustion unit 20 via lines 12 and 12b, whereas in accordance with the present invention a further part of low-Btu gases is supplied to the compressor 10 via a line 12a. The low-Btu gas is supplied to an additional inlet which is part of the compressor inlet 13. Thereafter the low-Btu gas and the air are mixed.

After compression and mixing of air and low Btu-gas the compressed mixture obtained is supplied via line 21 to said combustion unit 20 and after combustion hot product gas obtained is supplied via line 22 to an expansion turbine unit 30 which is coupled to compressor unit 10 via a shaft 31. After expansion expanded combustion gas is removed as exhaust gas via line 32.

Generally the axis of the expansion turbine unit 30 is coupled via a load shaft 41 to a load such as generator 40, for example for converting mechanical power into electrical power. Electrical power generated by said generator is represented by an arrow 50.

In the above system respective units and components are selected, arranged and coupled in a way well known to those skilled in the art. For example axial flow compressors or centrifugal compressors are employed. Different types of combustor units, provided with particular ignition means, fuel nozzles, and turbine nozzles, can be applied. As to the expansion turbine unit the one or the other design is applied which is strongly dependent on the feed supplied and the requirements coupled to the specific system. Furthermore a large scale on accessories is known for increasing performance of such systems, such as there are air filters, automatic control systems and reduction gears between compressor-turbine shaft and load shaft.

In addition to the above it will be clear to those skilled in the art that intermediate compressing, cooling, heating, or heat exchange in supply or feed back lines can be applied.

Figure 2:
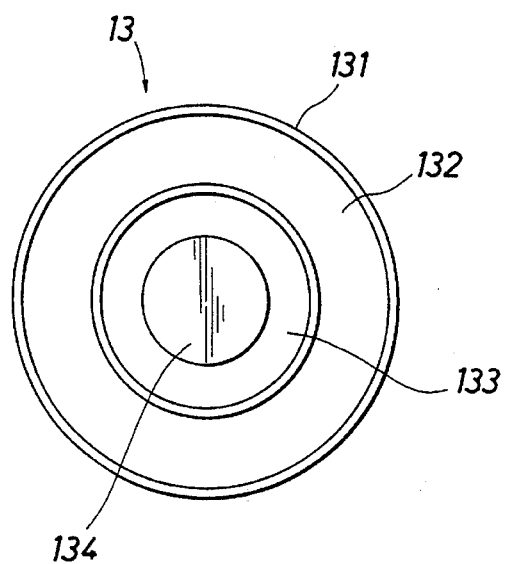
FIG. 2 is a schematic illustration of an elevation view of a first embodiment of a compressor inlet comprising the additional inlet of the present invention.
Figure 3:
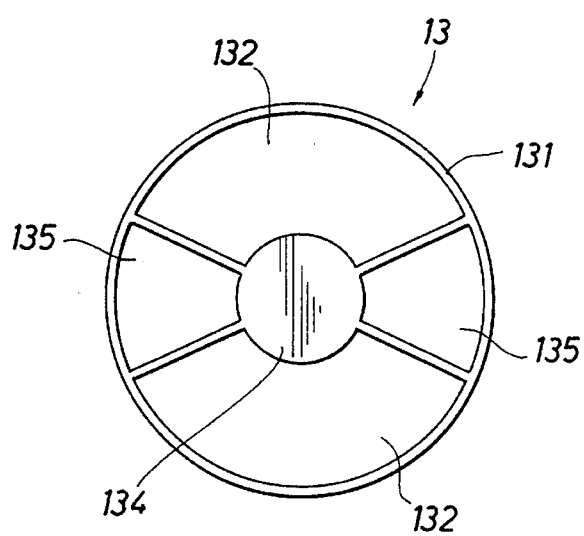
FIG. 3 is a schematic illustration of an elevation view of a second embodiment of a compressor inlet comprising the additional inlet of the present invention.

Whereas FIG. 1 presents an overview of a gas turbine system in accordance with the present invention, FIGS. 2 and 3 show further details as to embodiments of the compressor inlet and additional inlet in accordance with the present invention. In these figures like numbers are referring to like pans of the compressor inlet.

In FIG. 2 in an elevation view of a compressor inlet the inlet 13 comprises an outer tube 131, an annular concentric air inlet opening 132, an annular concentric additional inlet 133 for low-Btu gas, and an inner closed portion 134 along the axis of the inlet 13.

In FIG. 3 in an elevation view of a compressor inlet the inlet 13 comprises an outer tube 131, round an inner closed portion 134 along the axis of the inlet 13 two air inlet openings 132 which have a circle-sector like form, and two additional inlet openings 135 having the same form.

Also a combination of the above-mentioned embodiments may be applied.

By employing such embodiments air and low-Btu gas are distributed over the compressor inlet and both compression and mixing of air with low-Btu gas is obtained advantageously.

In the embodiments the number of openings, i.e. annulus and sectors, can be varied dependent on mixing requirements and compressor construction. By using the embodiments shown advantageously fuel and air are distributed uniformly at the compressor inlet.

Preferably the total surface of the additional supply inlet openings 133, 135 is at most 20% of the total compressor inlet surface in order to prevent auto-ignition in the compressor unit. Accordingly low-Btu gaseous fuel makes up at most 20% (by volume) of the total volume on gas supplied to the compressor unit.

Ranges for compressor pressures and temperatures are selected in a conventional way. It will be clear to those skilled in the art that they are strongly dependent for example on specific masses of the air and fuel, on their inlet temperature and pressure, on their composition, and efficiency requirements of the system of the invention.

A large variety of fuels can be employed. For example, besides the low Btu-gases from gasified biomass and blast furnace gas already mentioned, residual fuel gases and digester gas can be supplied to the system of the present invention. Furthermore additional mixing with other fuel gases may given advantageous results.

Further to the above, control means for controlling inlet opening surfaces can be employed in the system of the invention. For example, said control means may use a diaphragm means.

A number of variations have been disclosed for practicing the present invention. However, other modifications, changes and substitutions are intended in the foregoing disclosure. Further, in some instances, some features of the present invention will be employed without a corresponding use of other features described in these preferred embodiments. Accordingly, it is appropriate that the appended claims be construed broadly and in a manner consistent with the spirit and scope of the invention herein.

What is claimed is:

1. A method for operating a gas turbine system using low-Btu gaseous fuel, the method comprising feeding air to an annular concentric air inlet in a compressor unit, compressing said air in said compressor unit, passing said compressed air to a combustion unit, combusting in said combustion unit said fuel with the compressed air both supplied to said combustion unit thereby obtaining hot product gas, and expanding in an expansion turbine unit hot product gas supplied thereto to drive the expansion turbine unit and to generate mechanical power, the method further comprising supplying low-Btu gaseous fuel to an annular concentric low-Btu gas inlet in said compressor unit, wherein said low-Btu gaseous fuel is not more than 20 percent by volume of the total volume of gas supplied to said compressor unit.

2. The method as claimed in claim 1, wherein said air is mixed with said low-Btu gaseous fuel and is distributed at the inlet to said compressor.

3. A gas turbine system, which comprises a compressor unit having a compressor inlet for supplying air to be compressed to obtain compressed air, a combustion unit for combustion of low-Btu gaseous fuel with the compressed air thereby obtaining hot product gas, and an expansion turbine unit driven by the hot product gas supplied thereto and generating mechanical power, the system further comprising at the compressor inlet an additional inlet for supplying low-Btu gaseous fuel wherein said additional supply inlet has an inlet surface area making up at most 20% (by surface) of the surface of a compressor supply inlet.

4. The system as claimed in claim 3, wherein said additional supply inlet comprises at least two additional supply inlet openings.

5. The system as claimed in claim 3, wherein the compressor inlet has a substantially circular cross-section.

6. The system as claimed in claim 5, wherein said additional supply inlet has an annular concentric cross-section.

7. The system as claimed in claim 5, wherein said additional supply inlet openings have substantially circle-sector like cross-sections.

8. The system as claimed in claim 7, wherein the supply inlet openings are controlled by control means.

9. The system as claimed in claim 8, wherein said control means are diaphragm means.

10. A method for operating as gas turbine systems using low-Btu gaseous fuel, the method comprising:

feeding air to two circle-sector air inlets in a compressor unit;

feeding low-Btu gaseous fuel to two circle-sector low-Btu gaseous fuel inlets in said compressor unit;

wherein said low-Btu gaseous fuel is not more than 20 percent by volume of the total volume of gas supplied to said compressor unit;

thereby resulting in a mixture in said compressor of air and low-Btu gaseous fuel;

compressing said mixture of air and a low-Btu gaseous fuel in said compressing unit to obtain a compressed gas stream;

supplying fuel and the compressed gas stream to a combustion unit;

combusting said fuel with the compressed gas stream in the combustion unit thereby obtaining hot product gas; and driving an expansion turbine unit with the hot product gas to generate mechanical power.

11. A gas turbine system comprising:

a compressor unit for providing a compressed gas stream, said compressed unit comprising:

a compressor supply inlet for supplying air to be compressed in the compressed air stream;

a compressor;

an additional inlet for supplying low-Btu gaseous fuel to be compressed in the compressed gas stream wherein said additional supply inlet has an inlet surface area making up at most 20% (by surface) of the surface of a compressor supply inlet; and a compressor outlet for directing the compressed gas stream of mixed air and low-Btu gaseous fuel;

a combustion unit for combustion of low-Btu gaseous fuel with the compressed air thereby obtaining hot product gas; and an expansion turbine unit driven by the hot product gas supplied thereto and generating mechanical power.

12. The system as claimed in claim 11, wherein said additional supply inlet comprises at least two additional supply inlet openings.

13. The system as claimed in claim 11, wherein the compressor supply inlet has a substantially circular cross-section.

14. The system as claimed in claim 13, wherein said additional supply inlet has an annular concentric cross-section.

15. The system as claimed in claim 14, wherein said additional supply inlet openings have substantially circle-sector like cross-sections.

16. The system as claimed in claim 15, wherein the supply inlet openings are controlled by control means.

17. The system as claimed in claim 16, wherein said control means is a diaphragm.

* * * * *